Oct. 29, 1935.  F. P. ILLSLEY  2,018,724
SHUTTER OPERATING MEANS
Filed Sept. 23, 1929  3 Sheets—Sheet 1
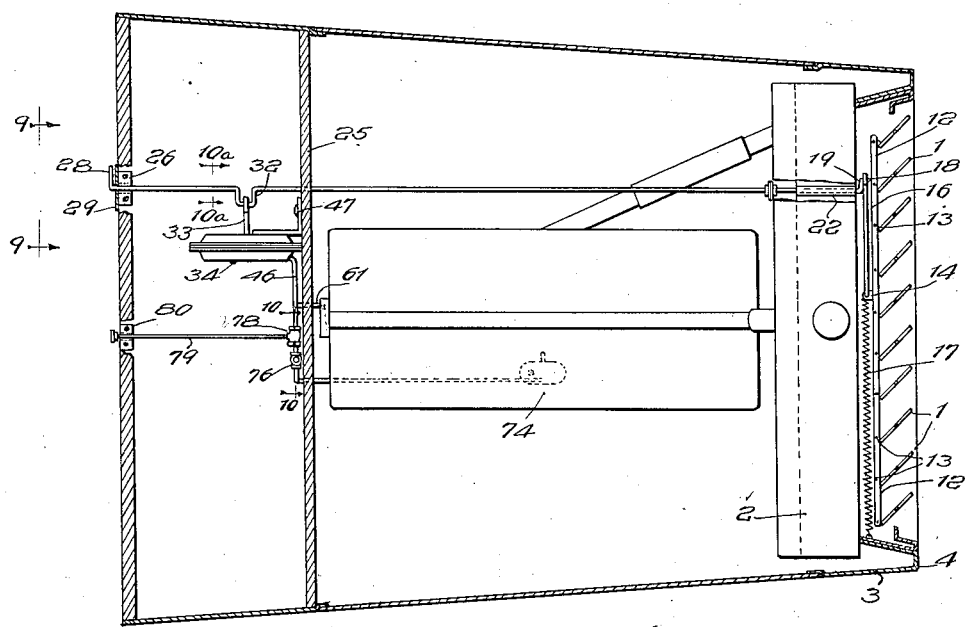
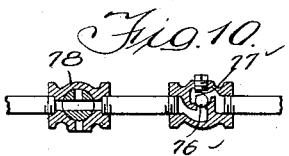
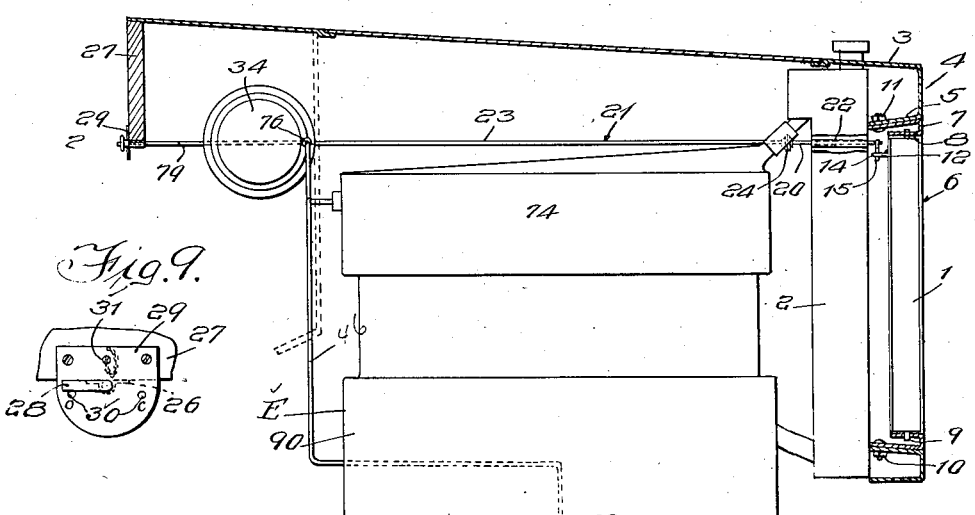

Oct. 29, 1935. F. P. ILLSLEY 2,018,724

SHUTTER OPERATING MEANS

Filed Sept. 23, 1929 3 Sheets-Sheet 2

Witness:
William P. Kilroy

Inventor
Frank P Illsley
By Brown, Jackson, Boettcher & Dienner
Attys

Oct. 29, 1935.  F. P. ILLSLEY  2,018,724
SHUTTER OPERATING MEANS
Filed Sept. 23, 1929  3 Sheets-Sheet 3
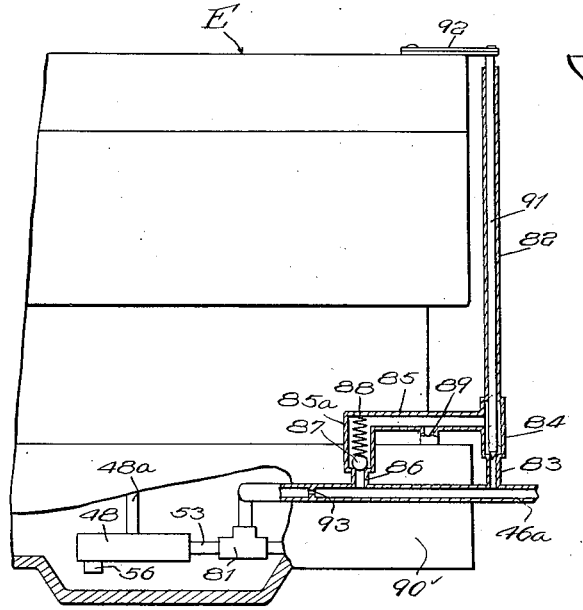
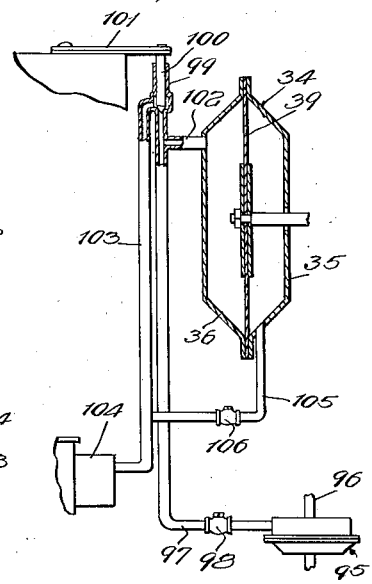
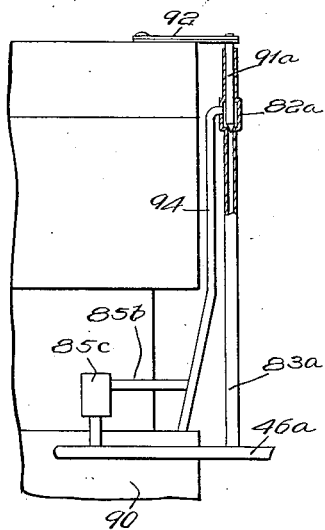
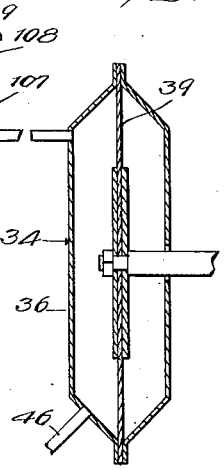
Witness:
William P. Kilroy
Inventor:
Frank P. Illsley
By Brown, Jackson, Boettcher & Dienner,
Attys Patented Oct. 29, 1935

2,018,724

UNITED STATES PATENT OFFICE 2,018,724

SHUTTER OPERATING MEANS

Frank P. Illsley, Norton Township, Muskegon County, Mich.

Application September 23, 1929, Serial No. 394,686

8 Claims. (Cl. 123—174)

This invention relates to shutter operating means, and more particularly to means for operating shutters for automobile radiators.

It is known to provide shutters for regulating the flow of air through an automobile radiator, thereby controlling the temperature of the water in the engine cooling system. In general, there are two methods of actuating the shutters under present practice. In one type of shutter operating means, the shutters are actuated by a thermostat mounted upon or adjacent the radiator. In this form the air flow is varied in accordance with temperature variations of the water in the radiator instead of in accordance with the variations in temperature of the water which surrounds the engine cylinders. This is objectionable to the extent that, under certain conditions, the temperature of the engine cylinders is not properly regulated, which is important in obtaining maximum efficiency in operation of the engine and avoiding damage thereto due to excessive overheating. Proper regulation of the temperature is also important, in cold weather, in preventing loss of the anti-freeze ingredient in the cooling liquid when a volatile anti-freeze is used.

In the second method of operating the shutters, with which I am familiar, suction is taken from the intake manifold or the engine cylinders. This method is objectionable for several reasons. It necessitates the admission of air to the intake manifold, which interferes with proper carburetion and the proper delivery of the fuel mixture to the engine cylinders. Under certain conditions this becomes a serious objection.

In a third form of shutter operating means with which I am familiar, the shutters are actuated by thermostatic means, disposed in a by-pass of the water circulating system. This is objectionable as complicating construction and, as being a source of possible trouble while also occupying space which, as a general rule, is quite limited.

In all of the shutter operating methods above referred to, the power for operating the shutters is quite limited. This is highly objectionable, particularly in cold and wet weather. Under such conditions, moisture collects upon the shutters and freezes. The thermostat for operating the shutter does not ordinarily possess sufficient power to break the shutters loose from this ice and operate them. As a result, the shutters are apt to remain closed, since the freezing of moisture on the shutters occurs more readily and is more effective in preventing operation of the shutters, when they are closed.

There is not, so far as I am aware, any means for the driver of an automobile to determine, from his position upon the driver's seat, whether the shutters are in closed or open position, or whether the shutters are operating. With the shutter operating means above referred to, there is danger, particularly in cold and wet weather, of the shutters failing to operate with the result that boiling of the cooling liquid occurs with resulting loss in efficiency in operation of the engine or actual damage thereto, as well as a serious loss in the volatile constituent of the anti-freeze mixture used, particularly when alcohol or other readily volatilized liquid is employed as an anti-freeze.

One of the main objects of my invention is to provide means for operating automobile radiator shutters, which means possesses ample power for assuring proper operation of the shutters under the most adverse conditions, such as where moisture collects and freezes upon the shutters. Another object is to provide means of this character which avoids the use of a thermostat for actuating the shutters and also eliminates any necessity of admitting air into the intake manifold of the engine. A further object is to provide means whereby the closing of the shutters, if open, will not occur immediately upon stopping of the engine but will be delayed until the engine has cooled down to a predetermined minimum temperature. An additional object of my invention is to provide simple and efficient means whereby the shutters can be operated automatically, or can be operated manually from the driver's seat, this means also serving to indicate the position of the shutters and whether they are operating properly. It is also an object of my invention to provide means whereby the motor for operating the shutters can be readily connected to a pressure or suction source for automatic operation, or to the atmosphere to permit manual operation of the shutters, as desired, or as conditions may require. Further objects and advantages of my invention will appear from the detailed description.

In the drawings:

Figure 1 is a plan view of shutter operating means in accordance with my invention as applied, parts being shown in section;

Figure 2 is a side view of shutter operating means in accordance with my invention as applied, partly in section;

Figure 9 is a view taken substantially on line 9—9 of Figure 1;

Figure 10 is a section taken substantially on line 10—10 of Figure 1, parts being shown in elevation, on an enlarged scale;

Figure 10a is a section, on an enlarged scale, taken substantially on line 10a—10a of Figure 1;

Figure 12 is a view partly broken away and in section illustrating connections for operating the shutter motor by pressure from the oil pump;

Figure 13 is a view partly broken away and in section illustrating a modification of the connections shown in Figure 12;

Figure 14 is a semi-diagrammatic view partly broken away and in section illustrating connections for operating the shutters from the fuel pump;

Figure 15 is a sectional view through the shutter operating motor and associated parts, parts being shown in elevation, illustrating means for venting from the shutter motor casing, gases which may tend to collect therein.

Figure 3:
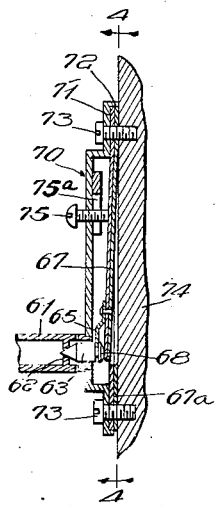
Figure 3 is a central longitudinal sectional view through the thermostat and associated parts, parts being shown in elevation, taken substantially on line 3—3 of Figure 4.

In Figures 1 and 2, I have illustrated my invention as used for operating shutters 1 mounted in front of a radiator core 2 about which extends a shell 3. The radiator core is connected to the water space about the cylinders and the cylinder head in a known manner to facilitate flow of water or a cooling liquid to the top tank of the radiator and then downwardly through the radiator, this water being returned from the the lower tank of the radiator to the water space, in a manner well understood in the art. Either a thermo-siphon circulating system, or a forced circulating system, may be used as desired.

The radiator shell 3 projects forwardly beyond core 2 and is turned inwardly to provide a flange 4, and then rearwardly to provide a second flange 5 which defines a rearwardly tapering opening adapted for reception of a correspondingly shaped shutter frame 6. This frame is conveniently formed of sheet metal and is provided with an inwardly extending flange 7, at its forward edge, and a rearwardly extending flange 8. This flange 8, which is provided at the top and the bottom of the frame 6, is adapted for reception of pintles 9 at the upper and lower ends of shutters 1. The flanges 8 are provided with suitably spaced openings which receive these pintles, the shutters being thus supported for turning movement on vertical axes.

The shutter frame may be secured in shell 4 in any suitable manner. In Figure 2 I have illustrated securing screws 10 passing through alined openings in flange 5 of the radiator shell and the corresponding flange of frame 6, these screws threading through nuts 11 which are spot welded or otherwise suitably secured to flange 5 at the opposite face thereof from frame 6. I do not intend, however, to in any way limit myself to this means of securing the shutter frame in position, since any other suitable or preferred means may be employed for this purpose.

A link 12 is disposed rearwardly of the shutters and is pivotally connected thereto, in a suitable manner, at 13. This link is disposed horizontally and is provided with a rearwardly extending ear 14 through which extends a finger 15 at one end of a connecting rod 16. A tension spring 17 is suitably secured at one end to finger 15 and has its other end suitably secured to shutter frame 6. This spring urges the link 12 in shutter closing direction.

Connecting rod 16 is provided, at its other end, with an eye 18 which receives the finger of a crank 19 at the forward end of section 20 of an operating rod 21. Section 20 is mounted for turning movement through a tube 22 suitably secured through radiator core 2.

The operating rod 21 comprises section 20 and a section 23 which is connected by a universal joint 24 to section 20. Section 23 of the rod extends through partition 25 of the automobile and is mounted, adjacent its rearward end, in a bearing strap 26 suitably secured to the lower edge of instrument board 27. An operating handle 28 is suitably secured upon the rearward end of rod 21 and moves over a plate 29 secured to and depending from instrument board 27. Since the operating rod is connected to link 12, it will be evident that this rod will turn in accordance with movement of the shutters. This plate is provided with the indications "open" and "closed" so disposed that, when the shutters are open, handle 28 will be in proper position to indicate this fact and, when the shutters are closed the handle will be in front of the proper designation upon plate 29. The plate 29 is further provided with three openings 30 for reception of a holding pin 31. Two of these openings are disposed adjacent the respective designations upon the plate and inwardly therefrom toward the operating rod. The third opening is so disposed that when the pin 31 is inserted into the same it will be out of the path of movement of handle 28. Conveniently, this third opening can be disposed above and adjacent the operating rod.

By inserting pin 31 into either of the other two openings, selectively, the rod can be locked against turning movement so as to hold the shutters in either open position or closed position, as desired. Under normal conditions, however, pin 31 is in the neutral opening and the operating rod is actuated by automatic means for opening and closing the shutters.

Figure 6:
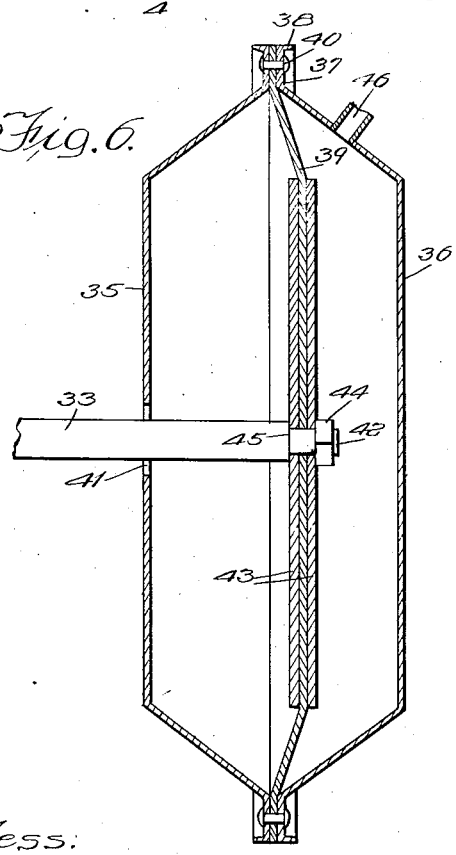
Figure 6 is a diametrical sectional view through the shutter operating motor, parts being shown in elevation.
Figures 7, 11:
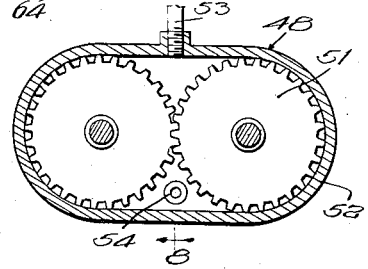
Figure 7 is a horizontal sectional view through the oil pump, parts being shown in elevation.
Figure 11 is a section taken substantially on line 11—11 of Figure 5.
Figure 8:
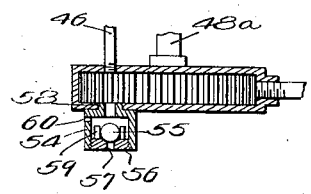
Figure 8 is a sectional view through the pump taken substantially on line 8—8 of Figure 7.

Section 23 of rod 21 is provided with a crank 32, to which is suitably connected one end of a rod 33 actuated by a motor 34. Referring more particularly to Figure 6, this motor 34 comprises a casing formed of two opposed dished sections 35 and 36 conveniently pressed from sheet metal. Each of these sections has an outer peripheral flange 37, the outer edge of which is preferably turned outwardly at 38 to impart added strength and rigidity thereto. A diaphragm 39 formed of rubber or other suitable material has its peripheral portion clamped between flanges 37, which are secured together by means of rivets 40 passing through these flanges and through the diaphragm. Rod 33 passes through a relatively large opening 41 at the central portion of section 35 of the casing and has its inner end portion reduced to form a stud 42. This stud extends through aligned openings through the center of diaphragm 39 and through discs 43 at opposite faces of the diaphragm. A nut 44 is screwed upon stud 42 and coacts with shoulder 45 of rod 33 to clamp the diaphragm between the discs.

In view of the fact that the diaphragm 39 is flexible, and the opening 41 is of appreciably greater diameter than rod 33, rocking movement of the rod is permitted to accommodate movement of the end thereof which is connected to crank 32 of the operating rod 21. A tube 46 extends from casing section 36 and provides means for connecting the same to either a source of suction or a source of pressure fluid. This provides means for operating the diaphragm so as to impart lengthwise movement to rod 33, thus turning the operating rod 21 in proper direction to open the shutters against the tension of spring 17.

The shutter operating motor 34 may be disposed in any suitable or convenient position. For convenience I have illustrated it as disposed beneath the cowl of the automobile body, and as supported by a suitable bracket 47 secured to casing section 35 and to partition 25 in a suitable manner. Tube 46 is extended downwardly and forwardly and opens into an oil pump 48, at the suction side thereof. This pump is of known type and is commonly disposed in a sump 49 of oil pan 50 of engine E. The pump is of the gear type and comprises two meshing gears 51 mounted in pump casing 52, one of these gears being driven in a suitable manner, as from the cam shaft of the engine through a drive shaft 48a. The outlet tube 53 of the pump extends from the discharge side thereof and is connected to a suitable conduit for conducting the oil to the bearing surfaces, in a known manner.

The inlet of the pump is through a valve cage 54 which depends from pump casing 52. A ball valve 55 seats in the upper face of a disc 56 which screws into the lower end of valve cage 54, this valve, when seated, closing an oil inlet port 57. At its upper end the valve cage is provided with a reduced neck 58 which screws into the pump casing and opens directly into the same at the intake space between the gears. The disc 56 is preferably provided with spaced upwardly projecting fingers 59 which serve to guide the valve 55. Valve cage 54 is further provided with a restricted inlet port 60 through which a relatively small quantity of oil is admitted to the pump until the suction therein reaches proper value to raise the valve 55.

An air inlet tube 61 opens at one end into tube 46, adjacent motor 34. This tube 61 is provided, adjacent its other end, with a restricted opening 62 controlled by a needle valve 63. This valve is provided, adjacent its head, with a circumferential groove 64 which receives the fingers of a suitably shaped leaf spring 65 which is slotted from its free end. The other end of this spring is suitably secured, as by a rivet 66, to a rectangular thermostat strip 67. The head 68 of valve 63 is confined between this strip and spring 65, which is offset relative to the strip, as in Figure 5, to accommodate the valve head.

Figure 4:
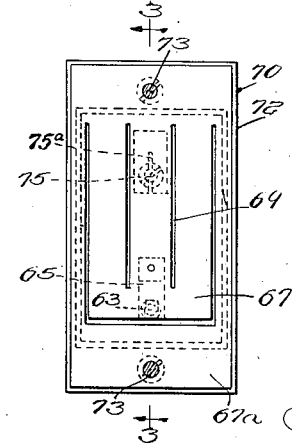
Figure 4 is an inner face view of the thermostat and associated parts taken substantially on line 4—4 of Figure 3.

The thermostat strip is, in general, of known type and need not be described in detail. It will be noted, however, by reference to Figure 4 that this strip is of appreciable width and is cut to provide a rectangular portion or tongue 67 formed integrally with an outer portion or frame 67a to which one end of the tongue portion is secured. The end of the tongue portion which carries spring 65 is free for movement in accordance with variations in temperature and is preferably provided with two or more longitudinally extending slots 69 to avoid excessive lateral distortion of the tongue while facilitating lengthwise bending or distortion thereof under temperature variations. A metallic housing 70 is disposed over strip 67 and is provided with a peripheral flange 71 which seats upon frame 67a of the thermostat strip, this flange having an inwardly extending peripheral bead 72 which fits about the periphery of element 67a of the thermostat strip so as to accurately position this strip in the housing 70. Securing screws 73 pass through aligned openings in flange 71 and frame 67a of the thermostat strip, and screw into cylinder block 74 of engine E, adjacent the top thereof. The thermostat strip is thus clamped securely to the cylinder block in intimate contact therewith, and the area of this contact is sufficiently great to assure proper response of the thermostat strip to variations in the temperature of the engine. The housing 70 defines, with the adjacent wall of the engine block, a dead air space which effectively shields the thermostat from air currents, which assures greater sensitiveness and accuracy in response of the thermostat to temperature variations of the engine than is possible where the thermostat is not thus shielded.

I preferably provide an adjusting screw 75 which extends through an opening in housing 70 and threads through a split nut 75a secured to the inner face of the housing, this nut acting to hold the screw 75 in adjustment through binding engagement therewith, in a known manner. By turning the screw in proper direction, the pressure exerted thereby upon the thermostatic strip can be increased or diminished, as desired, thus increasing or diminishing the resistance to distortion of the thermostatic strip in valve closing direction. In this connection, it is desired to point out that the screw 75 does not adjust the strip in such direction as to move the valve toward open position, but merely acts as a stop or abutment for the strip as it moves in valve closing direction. This provides an efficient adjusting means for determining the temperature at which the valve 63 closes while permitting desirable freedom of movement of the thermostatic strip.

Preferably, though not necessarily, I provide a ball check valve 76, and a three way valve 78, which are interposed in tube 46. The check valve 55 is normally held seated by a light coil spring 77 and opens toward the oil pump, closing toward motor 34. Three way valve 78 is normally in position to establish communication between the pump and the motor but may be turned into position to connect motor casing section 36 to atmosphere.

This valve 78 may conveniently be operated by a rod 79 extending therefrom and rotatably mounted in a bearing strap 80 secured to the lower edge of the instrument panel.

In the form of my invention illustrated in Figures 1 to 11, the motor 34 is operated by suction from the oil pump. Normally the shutters 1 are closed and crank 32 of the shutter operating rod is in approximately the dotted line position of Figure 10a. Under such conditions the valve 63 is in the open position illustrated in Figure 5, and a small quantity of air flows through ports 61a of the air inlet tube 61 and thence to tube 46 and then to the intake of pump 48. This serves to prevent the creation of a partial vacuum in casing section 36 of sufficient value to operate the diaphragm 39 for opening the shutters. As the engine temperature increases, the thermostatic strip moves the valve 63 toward closed position so that, when the engine has reached a predetermined maximum temperature, this valve is completely closed, thus preventing entry of air into tube 61.

The oil pump then acts to exhaust air from casing section 36 creating a partial vacuum at one side of the diaphragm so that atmospheric pressure is exerted at the other side of the diaphragm and acts to move it into the position of Figure 6. This retracts rod 33 and turns the shutter operating rod 21 in a clockwise direction, as considered in Figure 10a, into the full line position of this figure. When valve 63 is partially closed the resulting partial vacuum in casing section 36 acts to move the shutters into partly open position, it being understood that the shutters will fluctuate between full open position and full closed position in accordance with variations in the amount of heat which is generated by the engine during operation thereof, this serving to maintain the engine temperature uniform. This serves to open the shutters against the tension of spring 17. It is possible, by using a comparatively small diaphragm, to obtain ample power for opening the shutters under the most adverse conditions, even when the shutters are frozen closed as frequently occurs in wet and cold weather. In this manner, I provide simple and efficient means whereby it is possible to obtain ample power for operating the shutters in the opening thereof. In the event that the shutters are fully open with valve 63 full seated when the engine stops, the check valve 76 serves to trap the partial vacuum in casing section 36. This serves to hold the shutters 1 open until the engine has cooled down to a predetermined low temperature at which the thermostat strip 67 acts to open valve 63 thus admitting air through the air inlet tube 61 into tube 46. This satisfies the partial vacuum in the casing section 36 and the shutters are then closed by tension spring 17. I consider this delay in closing of the shutters, after stoppage of the engine, advantageous. In hot weather, it assures that the engine will be cooled to the desired extent before closing of the shutters. In cold weather, it is particularly advantageous as avoiding loss of the anti-freeze in the cooling liquid, where a volatile anti-freeze is used, due to heat absorbed from the engine. I thus avoid one of the most serious objections to shutters of present type which are operated by power derived from the engine, it being a characteristic of such shutters that they close as soon as the engine stops regardless of the temperature of the cooling liquid. This distinction of my shutter over shutters of the present type referred to is important from a practical standpoint, in view of the fact that a considerable transfer of heat from the engine to the cooling liquid continues after the engine stops. This condition is greatly aggravated, with a corresponding loss of anti-freeze, if the shutters close immediately upon stoppage of the engine, particularly when the engine has been subjected to heavy loads, which tend to cause it to over heat, as when driving through heavy snow or mud.

The check valve 76 also serves another important function. In the event of back firing of the engine, the direction of rotation of the crank shaft is reversed, thus reversing the direction of drive of the pump. Under such conditions the pump forces oil into the suction line and this oil would, in the absence of the check valve, flow into the casing of the shutter operating motor. Since check valve 76 closes away from the pump, it serves to effectually prevent passage of oil to the casing of the shutter motor, when back firing of the engine occurs, or when the direction of drive of the pump is reversed from any other cause.

Under certain conditions it may be desired to operate the shutters manually. To permit of this being done with facility, valve 78 is turned into position to connect casing 36 to atmosphere, cutting off the connection between this casing section and the oil pump. The shutters may then be operated by means of the rod 21 and, if desired, may be secured in either open or closed position by means of the pin 31. The handle 28 thus serves as an operating member for turning the rod 21, when desired, and also serves as an indicating member for indicating the condition of the shutters, as well as whether the shutters are operating properly, as will be indicated by the movement of handle 28.

In Figure 12 I have illustrated suitable connections for operating the motor 34 by pressure taken from the oil pump 48. In this modification, a tube 46a is connected, in a suitable manner, as by means of a T—81, to outlet tube 53 of the oil pump. This tube 46a is connected at its other end, to the motor casing section 36. A tubular valve casing 82 is connected at its lower end, by a reduced neck 83, to tube 46a. Neck 83 opens into an enlargement of casing 82 constituting a chamber 84. This chamber 84 is connected by an L-shaped by-pass tube 85 to tube 46a in advance of the neck 83. The vertical arm 85a of by-pass tube 85 is enlarged to provide a valve chamber the lower end portion of which is reduced to form a tubular neck 86 which opens into tube 46a. The upper end of this neck is normally closed by a ball valve 87 seating therein, this valve being urged in closing direction by a light coil spring 88.

Figure 5:
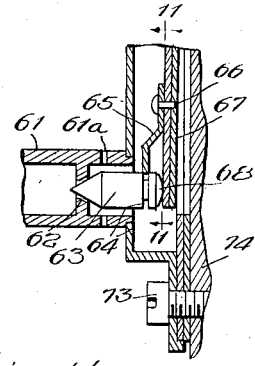
Figure 5 is a fragmentary sectional view, on an enlarged scale, through the thermostat and the valve operated thereby and associated parts, parts being shown in elevation.

The intermediate portion of by-pass 85 is connected by a short tube 89 to crank case 90 of the engine. An elongated needle valve 91 operates in the valve casing 82 and controls communication between chamber 84 and the reduced portion or neck 83 of casing 82. This valve extends upwardly beyond casing 82 and has its upper end connected to the free end of a thermostatic strip 92 suitably secured on the engine head. The upper end of valve 91 is preferably connected to strip 92 in the same manner as valve 63 of Figure 5 is connected to spring member 65. The tube 46a is preferably provided with a metering restriction 93 disposed in advance of neck 86. This restriction 93 assures an adequate supply of oil for operating the diaphragm 39, while preventing the diversion of an objectionably great amount of oil from the engine bearings. In practice, tube 46 of Figures 1 and 2, is provided with a similar restriction between tube 61 and the suction side of the pump.

With the connections of Figure 12, the pressure from pump 48 is utilized for opening the shutters. Under normal conditions, the shutters are closed and valve 91 is held raised from its seat by the thermostatic strip 92. This by-passes the oil from tube 46a into the crank case 90 and thus prevents the building up of a pressure in casing section 36 of sufficiently high value to operate the diaphragm 39 against the tension of spring 17. When the temperature of the engine E reaches a predetermined maximum, however, the thermostatic strip 92 closes valve 91 thus causing the oil to flow through pipe or tube 46a into casing section 36 of the motor 34 so as to build up a sufficiently high pressure to operate the diaphragm and open the shutters. The shutters will fluctuate between full open and full closed positions in accordance with partial opening and closing of valve 91.

An oil pump, such as that indicated at 48, produces a pressure of approximately 40 pounds to the square inch, on the average, and many oil pumps operate at a much higher pressure. By employing the pressure from the oil pump I am thus enabled to obtain ample pressure, when employing a diaphragm of comparatively small area, for opening the shutters under the most adverse conditions even when they are frozen shut, as above described. The valve 87 serves as a release valve to prevent bursting of the diaphragm due to excessive pressure exerted thereon. By employing a spring 88 of proper weight, the valve 87 is permitted to open so as to by-pass the oil into tube 85 and then through tube 89 into the crank case 90 when a predetermined maximum pressure upon the diaphragm is attained. This pressure is preferably such as to assure ample margin for the opening of the shutters while preventing injury to the motor 34 due to excessive pressures therein.

It will be noted that the tube or valve casing 82 fits snugly about the valve 91, there being but slight clearance between the valve and the casing, sufficient to prevent binding of the valve when the parts are heated from the engine. The valve casing 82 is also of appreciable height. This construction is sufficient to prevent leakage of oil about valve 91 due to the viscosity of the oil and the restricted space about the valve, while also preventing any binding of parts which would tend to prevent proper operation of the valve.

In Figure 13, I have illustrated a further modification for opening the shutters by pressure taken from the oil pump. In this form tube 46a, which extends from the outlet of the pump, is connected by a tube 83a to a valve casing 82a similar to but of much less length than casing 82 of Figure 12. A valve 91a operates in casing 82a and controls communication between the same and tube 83a. This valve is actuated by the thermostatic strip 92. A return tube 94 extends from the lower portion of valve casing 82a and opens into crank case 90 of the engine. When valve 91a is closed, the shutters are opened by the pressure exerted on the diaphragm by the oil delivered into casing section 36 under pressure from the pump. When valve 91a is open, the oil is by-passed from tube 46a through tube 83a, valve casing 82a and tube 94 to the crank case. A by-pass tube 85b connects tubes 99 and 94 and is provided with a valve casing 85c in which is disposed a spring pressed ball check valve similar to valve 87 of Figure 12. This valve acts in the same manner as valve 87 to prevent excessive pressure being built up in casing section 36.

In Figure 14 I have illustrated a further modification in which the diaphragm 39 of the shutter operating motor 34 is operated by pressure from a fuel pump 95. This pump is of the diaphragm type and is connected by a tube 96 to a suitable source of supply of fuel, as the main fuel tank. The pump itself is of known type and is driven in a known manner from the engine. The outlet of this pump is connected by a tube 97, in which in interposed a check valve 98 which opens away from the pump, to a tubular valve casing 99 in which operates a valve 100 actuated by a thermostatic strip 101 suitably secured to engine E. Tube 97 is connected, in advance of valve casing 99, to casing section 36 of motor 34 by a tube 102. A tube 103 connects valve casing 99 to a carburetor structure 104 of suitable type. Preferably, though not necessarily, I also provide a tube 105 establishing communication between section 35 of the casing of motor 34 and tube 103. A suitable check valve 106 is preferably disposed in tube 105, this valve opening toward tube 103 and closing toward casing section 35. In the event that leakage develops through the diaphragm 39, fuel which would otherwise tend to collect in the casing section 35 is drawn off through the tube 105. This is advantageous as eliminating possibility of fuel collecting in the casing of motor 34, in section 35 thereof, to such an extent as to flow from this section and thus creating a possible source of danger from fire. In this form of my invention, when valve 100 is closed, the liquid fuel is supplied to casing section 36 under pressure from pump 95 and serves to operate the diaphragm 39 for opening the shutters. When valve 100 is in open position, the fuel flows through tube 97, valve casing 99, and tube 103 to the carburetor structure 104. It will be understood that the connection to the carburetor from the outlet of pump 95 for the purpose of operating the diaphragm 39 is supplemental to the usual connection from the pump to the carburetor, which connection is known in the art and need not be illustrated nor described herein, it being sufficient to note that suitable means is provided for assuring a proper supply of fuel to the carburetor when valve 100 is closed and the shutters are opened.

In the several forms illustrated for operating the diaphragm of motor 34 by pressure, the shutters are operated in the same manner as in the suction operated form of my invention illustrated in Figures 1 and 2. It is to be noted, however, that when the diaphragm is operated by pressure for opening the shutters it is moved oppositely to its direction of movement when it is operated by suction. Strictly speaking, the diaphragm is operated by pressure in both instances, but the pressure applied to the diaphragm from the oil or fuel pump is applied at the opposite side thereof to the atmospheric pressure which is applied to the diaphragm by the creation of a partial vacuum in the casing section 36. It will be understood that the disposition of crank 32 of rod 21 will be such as to assure opening of the shutters in accordance with operation of the diaphragm. When the diaphragm is subjected to atmospheric pressure due to the creation of a partial vacuum in section casing 36, rod 33 is moved inwardly of the motor casing and the crank 32 is disposed in a substantially vertical position above the axis of rod 21 when the shutters are closed. When the diaphragm is operated, crank 32 is moved from the dotted line position of Figure 10a to the full line position of this figure, thus opening the shutters. When the diaphragm is operated by pressure from the fuel or the oil pump, the crank 32 of rod 21 should be disposed slightly below center, with the shutters closed, so that when rod 33 is projected rod 21 is turned in shutter opening direction. Obviously, the disposition of the crank 32 can be varied to suit the manner of operation of the motor 34 and the disposition thereof relative to the operating rod 21.

Under certain unfavorable conditions, there may be a tendency for fumes or gases to collect in section 36 of the casing of motor 34, when this motor is operated by suction taken from the oil pump or other suitable source. These fumes or gases may be injurious to the diaphragm 39 and tend to shorten the life thereof. Under such conditions, suitable means may be provided for venting casing section 36 with air. I have illustrated, in Figure 15, a means for accomplishing this. A vent tube 107 opens into casing section 36 and is controlled by a valve 108 carried by a thermostatic strip 109 suitably secured to engine E. Casing section 36 is connected to the suction side of the pump by tube 46, tube 61 of Fig. 1 being omitted. The valve 108 and strip 109, which are shown semi-diagrammatically, act in the same manner as valve 63 and strip 67 to control admission of air to the suction line. When valve 108 is open, air can circulate through casing section 36 so as to remove any injurious fumes or gases therefrom. When valve 108 is closed, the diaphragm 39 is actuated for opening the shutters in the manner previously described.

By employing a diaphragm for opening the shutters, I am enabled to obtain comparatively great power, amply sufficient to open the shutters under the most adverse conditions. It is also to be noted, that the use of a diaphragm avoids the loss of power due to friction or air leakage, and renders it possible to obtain relatively great power from a suitable source of either pressure or suction such as a fuel pump, oil pump, or other mechanism associated with an automobile.

Any other equivalent means can be substituted for the diaphragm, if desired. It is also noted that by my construction I avoid admission of air into the intake manifold of the engine such as would be apt to interfere with the proper carbureting and supply of the fuel mixture, under certain conditions.

It is known in the art to provide a loaded valve, or restrictions, in the pump line to assure delivery of the oil to the bearings at proper pressure when the oil pump is operating at its minimum speed. This pressure is amply sufficient to operate the diaphragm of the shutter motor in the forms of my invention, above described, in which the shutters are operated by pressure taken from the oil line. Since the provision of a loaded valve or a restriction in the pump line is known in the art, it is not necessary to illustrate or describe at length such arrangement, it being sufficient to note that it is known and common practice in the art.

As above indicated, and as will be understood by those skilled in the art, changes in construction and arrangement of parts of my invention may be resorted to without departing from the field and scope of the same, and I intend to include all such variations as fall within the scope of the appended claims, in this application in which the preferred forms only of my invention are disclosed.

What I claim is:—

1. In an automobile, in combination, an internal combustion engine having a cooling system including a radiator, shutters for regulating the flow of air through the radiator and urged in closing direction, a motor comprising a casing and a diaphragm therein, a pump driven by the engine, a suction line connecting the suction side of the pump to the casing at one side of the diaphragm, an air admission conduit opening into the suction line and having an air admission port, a thermostat subject to the engine temperature, a valve carried by the thermostat and controlling said port, the thermostat acting to move the valve in closing direction as the engine temperature increases and in opening direction as the engine temperature decreases, operating connections between the shutters and the diaphragm for moving the shutters in opening direction when the diaphragm is actuated due to the creation of a partial vacuum in the casing, and a check valve in the suction line between the pump and the air admission conduit, said valve opening toward the pump.

2. In an automobile, in combination, an internal combustion engine having a cooling system including a radiator, shutters for regulating the flow of air through the radiator and urged in closing direction, a motor comprising a casing and a diaphragm therein, means driven by the engine for creating a partial vacuum in the motor casing at one side of the diaphragm for causing movement thereof in shutter opening direction, operating connections between the shutters and the diaphragm for moving the shutters in opening direction upon movement of the diaphragm in such direction, means for regulating the degree of partial vacuum in the motor casing in accordance with variations in engine temperature, and means cooperating with the regulating means for trapping the partial vacuum in the motor casing when the engine stops.

3. In an automobile, in combination, an internal combustion engine having a cooling system including a radiator, shutters for regulating the flow of air through the radiator and urged in closing direction, a motor comprising a casing and a diaphragm therein, means driven by the engine and out of communication with the cylinders thereof for creating an operating pressure at one side of the diaphragm for moving the same in one direction, operating connections between the diaphragm and the shutters for moving the latter in opening direction when the diaphragm is moved in said direction, means for regulating the effective pressure applied to the diaphragm in accordance with variations in engine temperature, and fluid tight means cooperating with the regulating means for sealing said casing to the atmosphere at one side of said diaphragm for maintaining the pressure on the diaphragm when the engine reaches a predetermined high temperature and stops, said regulating means also operating to render said pressure ineffective when the engine has cooled down to a predetermined low temperature.

4. In an automobile, in combination, an internal combustion engine having a cooling system including a radiator, shutters for regulating the flow of air through the radiator and urged in closing direction, a shutter motor comprising a casing and a movable member therein, an operating rod accessible from the driver's seat and connected to the shutters, suction means driven by the engine for creating a partial vacuum in the casing at one side of the movable member for causing movement thereof in one direction, said suction means being out of communication with the engine cylinders, connections between said member and the rod for moving the latter in shutter opening direction upon movement of said member in said direction, means for regulating the degree of partial vacuum in the motor casing in accordance with variations in engine temperature, and means for optionally disabling the suction means, said rod providing means for manual opening of the shutters when the suction means is disabled.

5. In an automobile, in combination, an internal combustion engine having a cooling system including a radiator, shutters for regulating the flow of air through the radiator and urged in closing direction, a shutter motor comprising a casing and a movable member therein, an operating rod accessible from the driver's seat and connected to the shutters, suction means driven by the engine for creating a partial vacuum in the casing at one side of the movable member for causing movement thereof in one direction, said suction means being out of communication with the engine cylinders, connections between said member and the rod for moving the latter in shutter opening direction upon movement of said member in said direction, means for regulating the degree of partial vacuum in the motor casing in accordance with variations in engine temperature, means for optionally disabling the suction means, said rod providing means for manual opening of the shutters when the suction means is disabled, and indicating means associated with the rod for visually indicating the condition of the shutters and whether the shutters are operating when said suction means is effective for operating the movable member of the motor.

6. In an automobile, in combination, an internal combustion engine having a cooling system including a radiator, shutters for regulating the flow of air through the radiator and urged in closing direction, a shutter motor comprising a casing and a movable member therein, an operating member accessible from the driver's seat and connected to the shutters, a pump driven by the engine and independent of the cylinders thereof, a suction line connecting the suction side of the pump to the casing at one side of the movable member, connections between said movable member and the operating member for moving the latter in shutter opening direction upon movement of the movable member due to the creation of a partial vacuum in the motor casing, means for automatically regulating the partial vacuum in the shutter motor casing in accordance with variations in engine temperature, and valve means for optionally admitting air to the suction line for disabling the suction means, the operating member providing manual means for opening the shutters when the suction means is disabled, said operating member providing means for indicating whether the shutters are operating when the suction means is effective.

7. In an automobile, in combination, an internal combustion engine having a cooling system including a radiator, shutters for regulating the flow of air through the radiator and urged in closing direction, a shutter motor comprising a casing and a movable member therein, an operating member accessible from the driver's seat and connected to the shutters, a pump driven by the engine and independent of the cylinders thereof, a suction line connecting the suction side of the pump to the casing at one side of the movable member, connections between said movable member and the operating member for moving the latter in shutter opening direction upon movement of the movable member due to the creation of a partial vacuum in the motor casing, means for automatically regulating the partial vacuum in the shutter motor casing in accordance with variations in engine temperature, and a valve in the suction line and adjustable to either establish communication between the suction line and the shutter motor casing or cut off communication between the suction line and the casing and open said suction line to atmosphere, optionally, the operating member providing manual means for opening the shutters when the suction line is open to atmosphere.

8. In combination, valve means for controlling flow of a fluid, a motor comprising a casing and a diaphragm bridging the casing, suction means communicating with the casing for creating a partial vacuum within the casing and causing movement of the diaphragm in one direction and thereby moving said valve means in one direction, the valve means being yieldingly urged in the opposite direction, a check valve in the suction line and opening toward the suction means and closing toward the motor, an air admission conduit opening into the casing, a valve controlling said conduit, and thermo-responsive means for opening said control valve and effective for maintaining the control valve closed when the temperature to which the thermo-responsive means is subjected is at or above a predetermined high value and for maintaining the control valve open when the temperature to which said thermo-responsive means is subjected is at or below a predetermined low value.

FRANK P. ILLSLEY.